United States Patent [19]
Buck

[11] 3,796,506
[45] Mar. 12, 1974

[54] ADJUSTABLE ELECTROMAGNETIC DRILL MOUNT

[76] Inventor: Eugene W. Buck, 110 Lansberry Ct., Los Gatos, Calif.

[22] Filed: Dec. 16, 1971

[21] Appl. No.: 208,579

[52] U.S. Cl.................................. 408/76, 408/236
[51] Int. Cl............................................ B23b 39/14
[58] Field of Search ............ 408/76, 236, 712, 187, 408/188; 308/196; 269/231, 235; 287/58 CT, DIG. 8

[56] References Cited
UNITED STATES PATENTS

| 362,618 | 5/1887 | Gordon | 408/236 |
|---|---|---|---|
| 783,531 | 2/1905 | Maxwell | 269/231 X |
| 2,486,638 | 11/1949 | Eshleman | 269/235 |
| 2,682,933 | 7/1954 | Hoelscher | 408/236 X |
| 2,938,411 | 5/1960 | Herfurth | 408/76 |
| 3,159,061 | 12/1964 | Walker et al. | 408/76 |
| 3,254,547 | 6/1966 | Engelsted et al. | 408/76 |
| 593,373 | 11/1897 | Estell | 287/58 CT |

Primary Examiner—Andrew R. Juhasz
Assistant Examiner—Horace M. Culver
Attorney, Agent, or Firm—Allen & Chromy

[57] ABSTRACT

An adjustable electromagnetic drill mount provided with a base that magnetically grips the work surface. The drill or similar tool is mounted for rotatable movement up to 700° and also limited lateral movement with respect to its supporting magnetic base to locate the drill bit over the desired work point. The drill mount is provided with a clamping arrangement whereby the mount is firmly clamped to the magnetic base after the drill bit or other tool is located precisely over the work surface.

6 Claims, 16 Drawing Figures

PATENTED MAR 12 1974 3,796,506
SHEET 1 OF 3
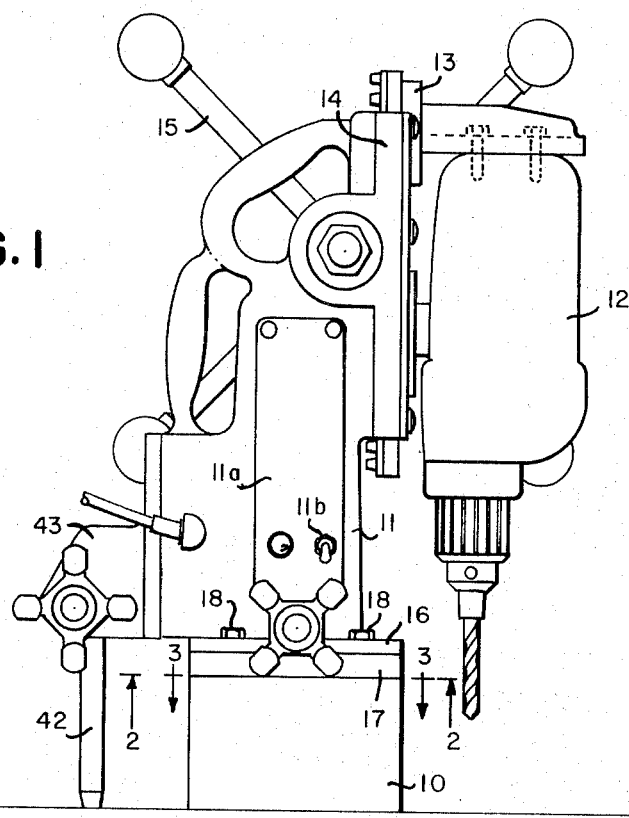
FIG.1
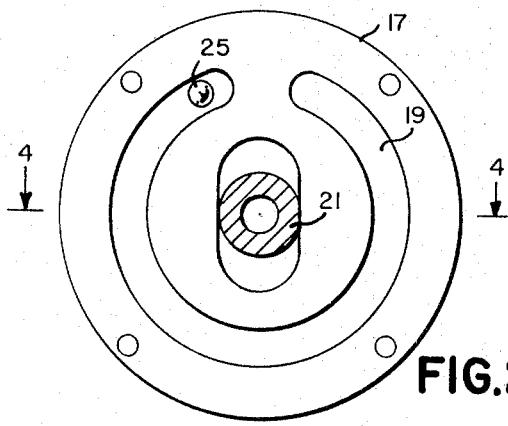
FIG.2
FIG.4
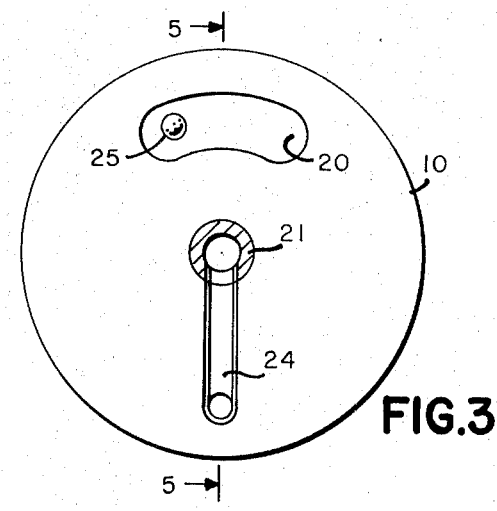
FIG.3
FIG.5
INVENTOR.
EUGENE W. BUCK
BY

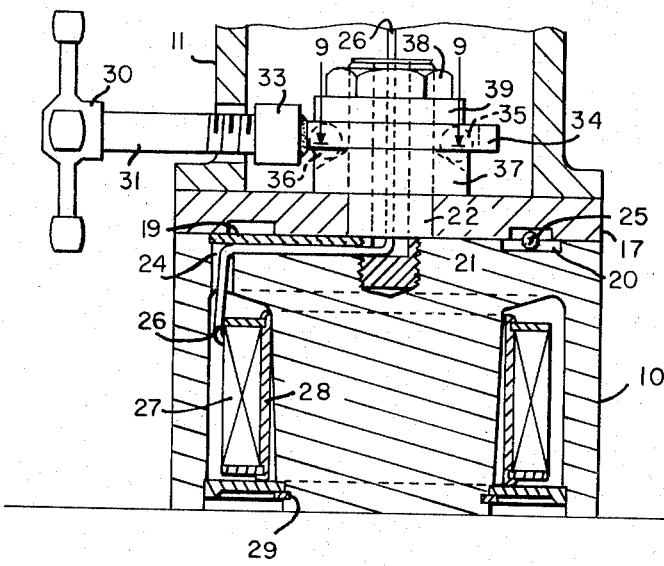
FIG. 6
FIG. 7
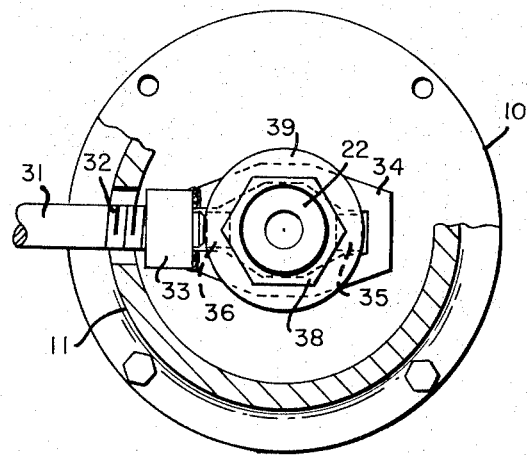
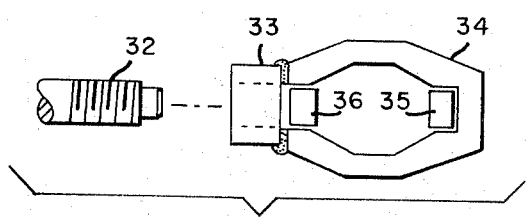
FIG. 8
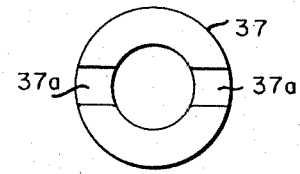
FIG. 9
INVENTOR.
EUGENE W. BUCK
BY
ATTORNEYS

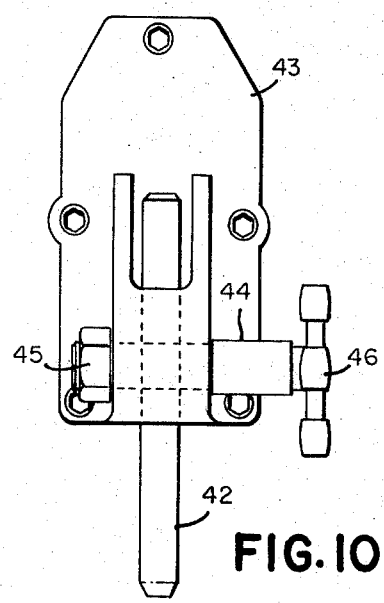
FIG. 10
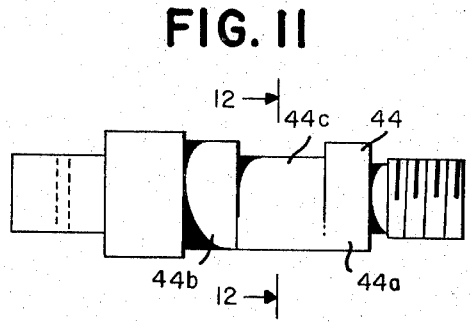
FIG. 11
FIG. 12
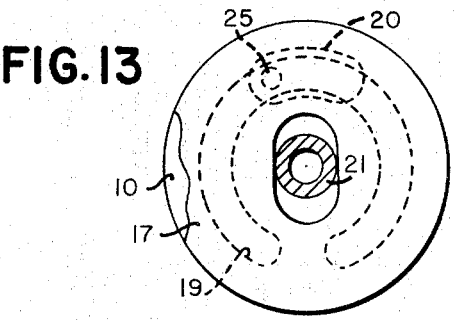
FIG. 13
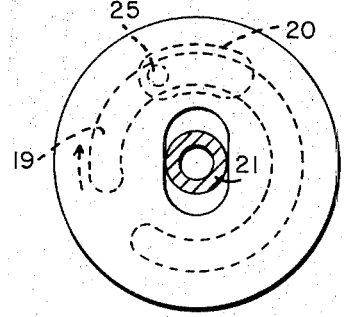
FIG. 14
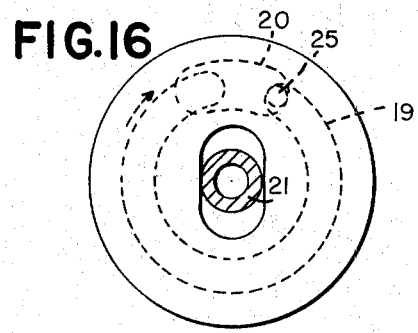
FIG. 15
FIG. 16
INVENTOR.
EUGENE W. BUCK

ADJUSTABLE ELECTROMAGNETIC DRILL MOUNT

DESCRIPTION OF THE INVENTION

This invention relates to portable electromagnetic drill mounts in general. More particularly this invention relates to an adjustable drill mount in which provision is made for rotating the drill mount through a relatively large angle and also lateral movement thereof with respect to the magnetic base of the mount.

An object of this invention is to provide an improved electromagnetic drill mount in which the tool may be adjusted with respect to the supporting base through a large angle.

Another object of this invention is to provide an improved electromagnetic drill mount in which the mount is rotatable through an angle in excess of 360° and limited lateral movement thereby providing a wide latitude of adjustment of the drill bit with respect to the work surface after the magnetic base grips the work surface.

Still another object of this invention is to provide an electromagnetic drill mount with an improved clamping arrangement for clamping the mount to the magnetic base whereby the mount may be firmly and positively clamped to the magnetic base after the drill bit is located over the desired point of the work surface.

Other and further objects of this invention will be apparent to those skilled in the art to which it relates from the following specification, claims and drawing.

This invention is an improvement over my prior U.S. Pat. No. 3,044,324. In accordance with this invention there is provided an adjustable electromagnetic drill mount with an improved clamping arrangement between the mount and the magnetic base, such that the mount carrying the drill bit may be moved through a complete circle with respect to the magnetic base after said base is energized and magnetically grips the work surface. This versatile adjustment of the mount with respect to the work surface is made possible by providing a plate between the mount and the magnetic base and said plate is attached to the mount. A curved groove extending over an angle of slightly less than 360° is provided to the bottom surface of this plate. Another groove of predetermined dimensions is provided in the top surface of the magnetic base and this groove is aligned with the groove provided in the underside of the aforesaid plate. A ball is positioned in said grooves to limit the rotary motion between the mount and the magnetic base. The clamping arrangement includes a pin threaded into the top of the magnetic base and extending through the above mentioned plate into the bottom of the drill mount to clamp the bottom surface of the aforesaid plate against the top surface of the magnetic base when the clamping mechanism is tightened by the operator after the point of the drill bit is located over the desired point of the work surface. This device is also provided with a rear leg cam lock for quick and automatic adjustment.

Further details and features of this invention will be set forth in the following specification, claims and drawing in which, briefly:

FIG. 1 is a view in side elevation of an electromagnetic drill mount embodying this invention;

FIG. 2 is a sectional view taken along the line 2—2 of FIG. 1;

FIG. 3 is a sectional view taken along the line 3—3 of FIG. 1;

FIG. 4 is a sectional view taken along the line 4—4 of FIG. 2;

FIG. 5 is a sectional view taken along the line 5—5 of FIG. 3;

FIG. 6 is a sectional view of the lower part of the drill mount and the magnetic base showing the clamping arrangement therebetween;

FIG. 7 is a horizontal view showing the top of the clamping arrangement shown in FIG. 6;

FIG. 8 is an exploded view of the clamping mechanism actuating device;

FIG. 9 is a plan view of the clamping washer employed in the clamping mechanism;

FIG. 10 is a vertical view of the stabilizing leg attaching means employed in this drill mount;

FIG. 11 is a view of the bolt with eccentric portion employed for clamping the stabilizing leg shown in FIG. 10;

FIG. 12 is a sectional view taken along the line 12—12 of FIG. 11; and

FIGS. 13, 14, 15 and 16 are views used to facilitate the description of the operation of this invention.

The adjustable electromagnetic drill mount as shown in FIG. 1 is provided with an electromagnetic base 10 which is attached to the bottom of a frame structure that includes an upright housing or post structure 11 on which a portable drill 12 which may be either electrically or air driven, is mounted in a conventional manner on a slide 13 carried in suitable guides 14. The slide 13 is adjustable vertically with the drill 12 thereon by means of the operating handle 15 in a conventional manner, for example, as disclosed in my prior U.S. Pat. No. 3,044,324 issued July 17, 1962. The post 11 is provided with a base 16 and the plate 17 is attached thereto by the bolts 18. The bottom surface of the plate 17 is provided with a groove or cavity 19 which is substantially concentric with the center of the plate and extends through an angle of slightly less than 360° as shown in FIG. 2. The upper surface of the base 10 is provided with a short circular cavity 20 as shown in FIG. 3 which is aligned with cavity 19 of the plate 17 and the steel ball 25 is located in these cavities. The base 10 is also provided with a threaded central hole 21 which receives the bottom threaded portion of the pin 22 as shown in FIG. 6. A channel 24 in the top of the base 10 extends radially from the central hole 21 into the coil cavity of the magnetic base 10 and the electrical connections 26 which are provided to the coil 27 are located in this channel. Channel 24 communicates with a hole in the wall of the hollow pin 22 and the electrical connections 26 are inserted into the hollow pin through this hole. Connections 26 are connected to a rectifier (not shown) which is positioned in the post 11 and rectifies the alternating current supplied to this device through the suitable electrical connection that is adapted to be plugged into conventional electrical outlets. Thus the coil 27 is provided with rectified electric current through the conductors 26. Coil 27 is wound on a suitable bobbin 28 and it is retained in the coil cavity, in the base 10 by the large washer 29 which is positioned in the bottom of the cavity and which is retained in place by the snap ring 29.

The plate 17 forms the bottom of the post 11 and it is attached to the flange 16 of the post 11 by the bolts 18. The plate 17 is clamped to the magnetic base 10 by the clamping mechanism which is adjusted by the handle 30 that is attached to the rod 31. Rod 31 extends out of the side of the post 11 through a suitable aperture provided in this post and the inner end of this rod is provided with threads which engage corresponding threads provided in member 33. Member 33 is attached by welding or the like to the yoke 34. However, the member 33 and yoke 34 may be made as a unit by precision steel casting. Two rollers 35 and 36 are positioned in recesses in the yoke 34 and they engage race ways 37a on opposite sides of the member 37 so that these rollers are positioned on opposite sides of the pin 22. Member 37 is of circular configuration and it is positioned around the pin 22 so that the rollers 35 and 36 are confined between the opposite walls of the race ways 37a and the respective recesses in the yoke 34. The bottom surface of member 37 engages the top of the plate 17. The upper part of the pin 22 is threaded and receives the nut 38 which engages the upper surface of the washer 39. Washer 39 is positioned over the yoke 34, and bottom surfaces of this washer are engaged by the rollers 35 and 36 as shown in the drawing. When the operator desires to tighten the post to the magnet base he turns the handle 30 so that the inner end of rod 31 presses roller 36 inward and at the same time yoke 34 urges roller 35 inward thereby exerting pressure against washer 39 to clamp the bottom 17 of the post against the top of the magnet base. Loosening of the rod 31 of course removes the pressure of the rollers 35 and 36 on washer 39 and permits rotative motion of the post with respect to the magnet base.

This device is also provided with a stabilizing leg 42 that is attached to the bracket 43 which is attached to the rear of the post 11 by suitable bolts as shown in FIG. 10. Leg 42 is held in a predetermined position in a hole formed in the bracket 43 and an eccentric device 44 is provided for this purpose. The eccentric device 44 is provided with bearing surfaces 44a and 44b which are journaled in suitable holes formed in the bracket, and the eccentric 44c is positioned between these bearing surfaces. The device is provided with a nut 45 threaded thereto for retaining it in position on the bracket and the other end of the device is provided with an operating handle 46. Thus, when the leg 42 is positioned in the bracket 43 the handle 46 is rotated so that the eccentric surface 44c is brought to bear against the leg 42 and hold it fixed in its adjusted position.

FIGS. 13, 14, 15 and 16 are schematic drawings illustrating four different positions of the bottom of post 11 and the groove 19 with respect to the top of the magnetic base 10 and groove 20. Groove 20 limits the movement of ball 25. When the post is rotated clockwise as indicated by the arrows in FIGS. 14 and 15 one end of groove 19 will engage the ball 25 as shown in FIG. 15 and further clockwise motion will move the ball 25 to the right hand end of groove 20 as shown in FIG. 16 at which point clockwise rotation of the post is arrested. This procedure may be reversed and the post rotated counterclockwise. After rotation through an angle of about 330° the ball 25 is engaged by an end of groove 19 and after further rotation of the post through an angle of about 70°, rotation is arrested since the ball is moved against the left hand end of groove 20. If each of the grooves 19 and 20 is made slightly less than 360° then this arrangement permits rotation of the drill post through an angle approaching 700° depending upon the lengths of the grooves 19 and 20, so that the operator is permitted a wide latitude of rotative adjustments of the drill bit with respect to the work surface. Also, the plate 17 attached to the bottom of the post is provided with an elongated hole for receiving the pin 22 so that limited lateral movement of the post is permitted throughout the large angle of adjustment. As a result the operator can save valuable time in using this device in drilling a plurality of holes that are in a given space around the magnet base without de-energizing and moving the base.

After the drill bit is positioned over the desired point of the work surface the clamping mechanism is tightened by tightening the handle 30 and applying pressure to roller 36 thereby causing this roller to move up one of the inclined surfaces 37a against washer 39. At the same time yoke 34 causes roller 35 to move up the other inclined surface 37a against washer 39. As a result, the bottom surface of member 17 is clamped against the top surface of the magnet base 10 and the post 11 is immobilized on this base. Of course, when it is desired to adjust the post 11 with respect to the base 10 the clamping mechanism must be loosened by rotating handle 30 in the opposite direction.

While I have shown and described a preferred form of the invention it will be apparent that the invention is capable of variation and modification from the form shown so that the scope thereof should be limited only by the scope of the claims appended hereto.

What I claim is:

1. In an adjustable electromagnetic drill mount, the combination of a magnetic base having an electrically energized coil positioned in a cavity therein for magnetizing said base, a post having means attaching a portable drill thereto, adjustable means attaching said post to said base, said last mentioned means including means releasably clamping said post to said base permitting rotation of said post with respect to said base when released, and rotation limiting means between the bottom of said post and the top of said magnetic base, said rotation limiting means comprising a loose member movable in grooves formed in the bottom surface of said post and in the top surface of said magnetic base limiting rotational movement of said post with respect to said base when ends of said grooves engage opposite sides of said member.

2. In an adjustable electromagnetic drill mount, the combination as set forth in claim 1, further characterized in that said adjustable means attaching said post to said base comprises a pin attached to said base extending upward into said post through the bottom of said post, a pair of washers surrounding said pin and said clamping means comprising means positioned between said washers forcing said washers apart and tightly pressing the bottom of the base plate of said post against said base.

3. In an adjustable electromagnetic drill mount, the combination as set forth in claim 2, further characterized in that one of said washers is provided with oppositely inclined surfaces and said clamping means includes rollers engaging said inclined surfaces and pressing said washers apart.

4. In an adjustable electromagnetic drill mount, the combination as set forth in claim 3, further characterized in that said clamping means includes a yoke confining said rollers between said washers and manually operable means attached to said yoke engaging one of said rollers.

5. In an adjustable electromagnetic drill mount, the combination as set forth in claim 1, further characterized in that said loose member comprises a steel ball or free floating member and said rotational movement of said post with respect to said base is equal substantially to the combined lengths of said grooves.

6. In an adjustable electromagnetic drill mount, the combination of a magnetic base having an electrically energized coil positioned in a cavity therein for magnetizing said base, a post having means attaching a portable drill thereto, adjustable means attaching the bottom of said post to said base, said last mentioned means including means releasably clamping said post to said base permitting rotation of said post with respect to said base when released, and rotation limiting means between the bottom of said post and the top of said magnetic base, said rotation limiting means comprising a floating member extending into and movable in opposing arcuate grooves formed in the bottom of said post and in the top of said base.

* * * * *